Jan. 21, 1964 M. C. SANZ 3,118,306
PIPETTE
Filed Jan. 6, 1961
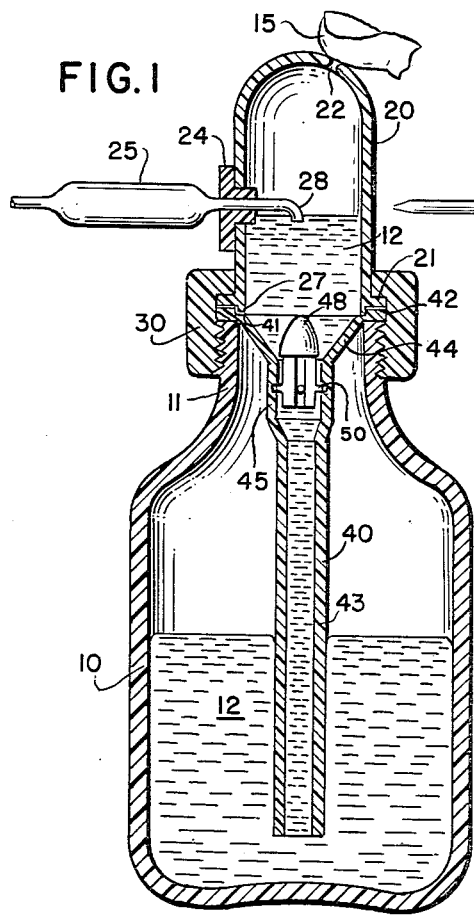
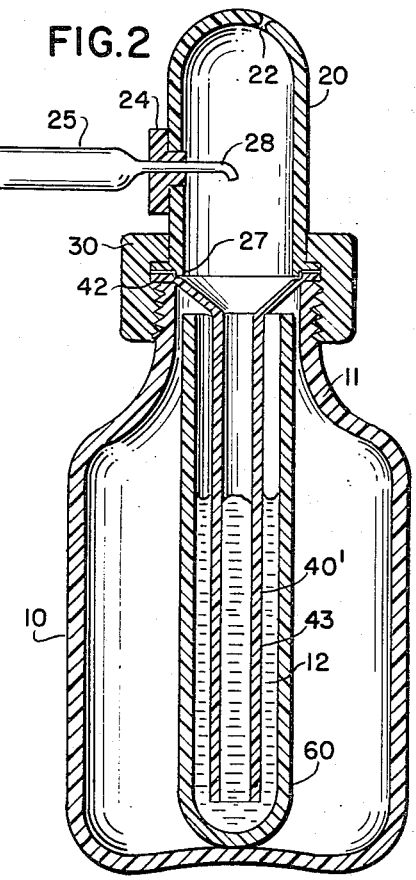
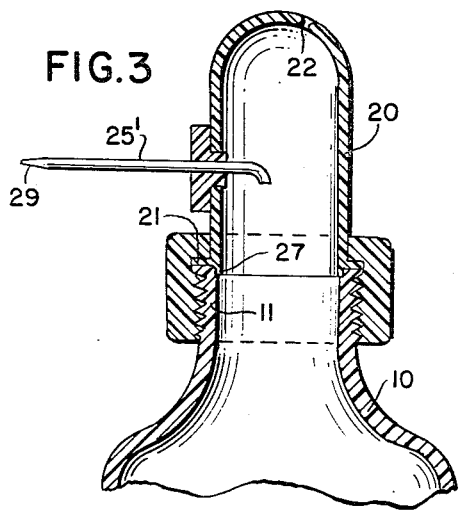
INVENTOR.
Manuel C. Sanz United States Patent Office
3,118,306
Patented Jan. 21, 1964

3,118,306
PIPETTE
Manuel Claude Sanz, Rte. de Ferney,
Geneva, Switzerland
Filed Jan. 6, 1961, Ser. No. 81,116
2 Claims. (Cl. 73—425.4)

This invention relates to pipettes for transferring predetermined reproducible quantities of liquids.

This application is a continuation-in-part of U.S. Application Serial No. 652,265, now U.S. Patent No. 2,974,528, filed April 11, 1957. In that application, there are disclosed pipettes which include the container or reservoir for the liquid to be transferred in reproducible quantities. Such pipettes comprise a measuring tube with one end extending into a chamber into which the liquid from the container or reservoir may be forced; the chamber has an outlet to the atmosphere which may be closed to force liquid from the chamber into the measuring tube and then opened to allow excess liquid to flow back into the reservoir when the outlet to the atmosphere is opened and pressure released. In order to deliver the liquid retained in the measuring tube, the outlet of the chamber is first closed and then pressure is applied to the reservoir which will force the liquid out of the measuring tube.

Among the objects of the present invention is to provide a pipette similar to that disclosed in said application No. 652,265 which, however, is simpler to operate and more reliable with respect to the avoidance of air bubbles.

Another object of the present iinvention is to provide means for automatically closing the outlet of said chamber upon pressure applied to the reservoir and automatically opening said outlet upon release of said pressure.

The objects are attained by providing that portion of the pipette measuring tube which is within the chamber with a downwardly turned end which opens downwardly towards the liquid which is forced upwardly into the chamber.

In the drawings:
FIG. 1 is a side cross sectional view of one form of the pipette of the invention.
FIG. 2 is a side cross sectional view of a modified form of pipette.
FIG. 3 is a view of a pipette sampling bottle obtained by removing parts of the device of FIG. 10.

The pipette comprises a compressible reservoir or bottle portion 10, a chamber forming top portion 20, a cap 30 and a connecting tube 40. The bottle or reservoir 10 has a threaded neck 11. It is made of flexible plastic material so that upon the application of pressure thereto, liquid is forced through tube 40 into chamber 20.

The chamber 20, as shown, is dome shaped and has a lower shoulder 21 which fits into the cap 30, an orifice 22 in the upper portion which may be closed by a finger 15 and an opening 23 in a side portion which is adapted to hold the plug 24 which holds the pipette measuring tube 25. The open end of chamber 20 also has a cylindrically extending flange 27 which interfits with an annular groove 41 of the tube portion 40. The inner end 28 of the pipette measuring tube 25 turns downwardly as shown. In FIG. 1, the liquid 12 is shown at the level it attains just as the measuring tube 25 is being filled. In this structure there is less chance that air bubbles will be introduced along with the liquid 12 and the aspirating effect on the tube 25 of the movement of liquid 12 back into reservoir 10 is of shorter duration.

The tube 40 may be made of glass, plastic or any material which is inert to the liquid 12. Tube 40 has the annular shoulder 42 adapted to be held against the neck 11 of the reservoir 10 by cap 30. The inner opening of the shoulder 42 includes the annular groove 41 into which the cylindrical flange 27 of chamber 20 fits. The diameter of the lower portion 43 of the tube may be quite small, if desired. Adjacent the funnel shaped region 44, however, an enlarged portion 45 is provided to hold a splash guard 48 of convenient size.

FIG. 2 is similar to FIG. 1 except that the device of FIG. 2 contains a glass vessel 60 which holds liquid 12. This device is useful where the liquid 12 attacks the material of the reservoir 10. In this case the tube 40' must also be of glass. The device of FIG. 2 operates in the same way as the device of FIG. 1.

If desired, the tube 40 of FIG. 1 may be removed to produce the device shown in FIG. 3. The device of FIG. 3 is useful as a sampler. Thus, while the orifice 22 is held closed and the reservoir 10 at least partially compressed, the nozzle 29 of measuring tube 25' may be dipped into a liquid to be sampled and the pressure on reservoir 10 released to draw the sample into tube 25'. When the measuring tube 25 is filled it is withdrawn and the contents thereof may be discharged into a suitable sample holder.

The features and principles underlying the invention described above in connection with specific exemplifications will suggest to those skilled in the art many other modifications thereof. It is accordingly desired that the appended claims shall not be limited to any specific feature or details thereof.

I claim:
1. A pipette device comprising a reservoir for retaining liquid to be metered;
   means forming a chamber above the reservoir;
   communication means for delivering the liquid between the chamber and the reservoir in both directions;
   a capillary tube of predetermined length and cross-sectional area mounted in said means for forming the chamber with a first end of the tube extending within the chamber and the other end extending from a side of the chamber;
   the first end of the capillary tube extending downwardly so as to open toward said reservoir;
   said means for forming the chamber including means above the level of the first end of said capillary tube for opening the chamber to the surrounding air.
2. A pipette device comprising a reservoir for retaining liquid to be metered;
   means forming a chamber above the reservoir;
   communication means for delivering the liquid between the chamber and the reservoir in both directions;
   a capillary tube of predetermined length and cross-sectional area mounted in said means for forming the chamber with a first end of the tube extending within the chamber and the other end extending from a side of the chamber;
   said means for forming the chamber including one way valve means above the level of the first end of said capillary to provide communication between the inside of said chamber and the outside thereof in such a way that upon pressure applied to a fluid in the reservoir said valve is closed and immediately opened when pressure is released.

References Cited in the file of this patent
UNITED STATES PATENTS

| | | |
|---|---|---|
| 555,588 | Spencer | Mar. 3, 1896 |
| 2,311,367 | Chambers | Feb. 16, 1943 |
| 2,466,128 | Smith | Apr. 5, 1949 |
| 2,540,360 | Ulvid | Feb. 6, 1951 |
| 2,655,175 | Glidden | Oct. 13, 1953 |
| 2,728,232 | Bremmer | Dec. 27, 1955 |
| 2,730,270 | Heeneman | Jan. 10, 1956 |
| 2,974,528 | Sanz | Mar. 14, 1961 |